US006882594B1

(12) United States Patent
Pujolas

(10) Patent No.: US 6,882,594 B1
(45) Date of Patent: Apr. 19, 2005

(54) FLYING INSECTS REPELLING SYSTEM

(76) Inventor: Robert David Troy Pujolas, 7 Ashwood Avenue, Pefferlaw, Ontario (CA), L0S 1N0

( * ) Notice: Subject to any disclaimer, the term of this patent is extended or adjusted under 35 U.S.C. 154(b) by 0 days.

(21) Appl. No.: 10/841,085

(22) Filed: May 10, 2004

(51) Int. Cl.$^7$ ................................. H04B 1/02
(52) U.S. Cl. ..................... 367/139; 43/132.1
(58) Field of Search .............. 367/139; 116/22 A; 43/132.1; 340/384.2

(56) References Cited

U.S. PATENT DOCUMENTS 3,886,492 A * 5/1975 White ................. 367/139
4,566,085 A * 1/1986 Weinberg .............. 367/139
6,570,494 B1 * 5/2003 Leftridge, Sr. .......... 340/384.2

* cited by examiner

Primary Examiner—Ian J. Lobo
(74) Attorney, Agent, or Firm—David W. Wong

(57) ABSTRACT

The system repels noxious flying insects such as female mosquitos from an intended area by broadcasting a series of ultrasonic turbulence waves over the area. The turbulence waves have frequencies which are multiples of the wing beat speed of the insects. The ultrasonic waves are inaudible to humans or animals and they cause the wings of the insects to fluctuate and vibrate such that the insect avoid flying into the intended area.

6 Claims, 1 Drawing Sheet

FLYING INSECTS REPELLING SYSTEM

FIELD OF INVENTION

This invention relates to a system for repelling flying insects and more particularly a method and device for repelling mosquitos.

BACKGROUND OF INVENTION

Many flying noxious insects such as mosquitos not only cause annoyance to humans when bitten by such insects, the venoms of these insects can cause skin irritations and inflammation in the mildest case, to stings causing severe allergic reaction such as anaphalactic shock if not treated quickly. The insects may also be carriers of infectious diseases such as malaria, typhoid, yellow fever, cholera and West Nile virus that could be fatal to humans. The disease or virus is passed on to humans upon being bitten by the insects infected with such disease or virus.

Numerous methods and devices have been developed for repelling annoying insects or for decimating them so as to prevent them from biting humans. A well known method is by burning an incense which produces a poisonous smoke that would repel or kill the insects; however, such method is rather ineffective and the smoke may also be harmful to humans. Another method is by producing a high frequency sound which is audible to the annoying insects and yet not audible to humans. This sound duplicates the sound of the predators of the insects. The sound is broadcast over a wide area of space around the humans so that it would drive the noxious insects away from the area upon sensing the presence of their predators. However, this method is also found to be ineffective.

An effective method of eliminating noxious insects in an area is by spraying insecticide. However, the insecticide spray would cause pollution to the natural environment and it may also cause harmful effects to humans as well.

Applying insect repelling oil, ointment or spray directly on exposed skin is another effective way of repelling noxious insects, but again the oil or ointment or spray may cause skin irritation and discomfort, and they may also cause harmful effect to human health with long term use.

SUMMARY OF THE INVENTION

It is a principal object of the present invention to provide an effective system for repelling noxious insects which is not harmful to humans or animals in any way.

It is another object of the present invention to provide an insect repelling device which is simple to operate and easy to fabricate.

It is another object of the present invention to provide a portable device which is operable in any selected area.

It is yet another object of the present invention to provide a device which does not cause any pollution to the environment or any harmful effect to humans in its operation.

Briefly, the system of the present invention produces ultrasonic turbulence waves and broadcasts them over an intended area. The ultrasonic waves are in multiple frequencies of the wing speed of the noxious insects such as mosquitos. When the insects encounter such ultrasonic waves, the waves would cause the wings of the insects to fluctuate or vibrate such that they cannot fly, an effect similar to an airplane encountering severe air turbulence, so that the insects would stay away from the area covered by the ultrasonic waves.

BRIEF DESCRIPTION OF THE DRAWING

Other objects and advantages of the present invention will become apparent from the following detailed description of the preferred embodiment thereof in connection with the accompanying FIG. 1 of the drawing which shows the schematic circuit diagram of the device of the present invention.

DETAILED DESCRIPTION OF THE PREFERRED EMBODIMENT

Figure 1:
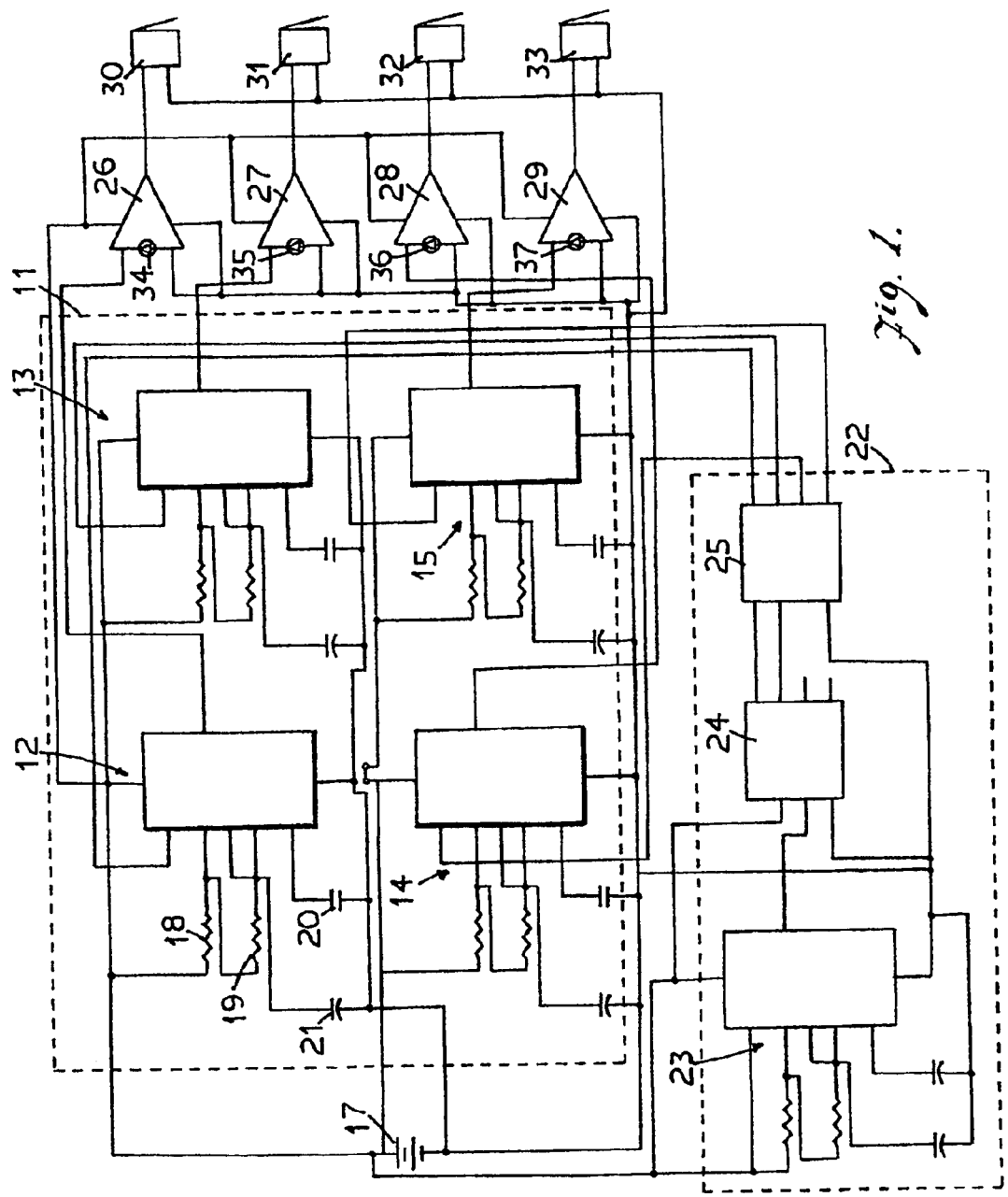

The system of the present invention generates ultrasonic frequency waves which are multiple frequencies of the wing speed of the noxious flying insects in flight. The ultrasonic waves are broadcast over an area to be protected so that they create air turbulence that would disturb the noxious flying insects in the intended area. The wings of the insects attempting to fly encountering air turbulence so that the insects would refrain from flying into the protected area and thus creating a flying insect free zone. For example, the wing speed of female mosquitos in flight beats at approximately 600 beats per minute. Therefore, the effective ultrasonic turbulence waves for repelling female mosquitos are multiples of 600, namely 36 KHz, 54 KHz, 72 KHz, and 96 KHz etc. These ultrasonic waves are not audible to humans and animals and also would not interfere with the operation of other electronic and communication equipment. The effective frequencies of the ultrasonic waves may be varied according to the wing speed of the noxious flying insects to be repelled.

An exemplary system for providing the required ultrasonic turbulence waves according to the present invention is best shown in FIG. 1. The system 10 has a signal generator 11 which includes four pulse generators 12, 13, 14 and 15. The pulse generators may consist of a timer such as a timer 16 having its input terminals connected to an operating power supply 17 through resistors 18 and 19 and capacitors 20 and 21. All four pulse generators have a similar construction but operate to generate pulses at the four different selected frequencies. The duration of the generation of the pulses is controlled by a timer circuit 22 which consists of a pulse generator 23 and two duration timers 24 and 25 such that each one of the pulse generators 12, 13, 14 and 15 generate the required individual pulses for a duration of ¼ of a second. For simplicity of manufacturing, the pulse generator 23 may have similar construction to the pulse generators 12, 13, 14, and 15. The signals from the pulse generators 12, 13, 14 and 15 are amplified by individual amplifiers 26, 27, 28, and 29 respectively and the amplified signals actuate transducers 30, 31, 32, and 33 respectively to produce the turbulence waves for broadcasting them over the intended area.

Light emitting diodes (LED) 34, 35, 36, and 37 are provided across the input terminals of the amplifiers 26, 27, 28, and 29 respectively. These LEDs will blink constantly at a rate of four times per second to indicate the continued generation of the required turbulence waves during the operation of the system. A dual voltage LED (not shown) may also be incorporated in the system, which would change the color of its emitting light if the voltage of the power supply 17 falls below a threshold operating level.

Due to the simplicity of the system, it may be constructed in a small portable size, and the system is operable conveniently with a 9 volt battery such that the unit may be simply carried or worn by a person or placed outdoors or indoors.

Various modifications can be made without departing from the spirit of this invention or the scope of the appended claims. The embodiment of the invention set forth in this disclosure is given as an example and is in no way final or binding. In view of the above, it will be seen that the objects of the invention are achieved and other advantages are obtained. As many changes could be made in the above construction and method without departing from the scope of the invention, it is intended that all matter contained in the above description shall be interpreted as illustrative and not in a limiting sense.

What I claim is:

1. A system for repelling a selected kind of noxious insect having a predetermined wing speed in flight, comprising:

generating a series of individual ultrasonic turbulence waves wherein each turbulence wave is of a selected frequency having a multiple of the wing speed of said insect, controlling generation of said ultrasonic turbulence waves whereby each turbulence wave of said selected frequency is generated for a fraction of a second serially in succession, broadcasting said ultrasonic turbulence waves over an intended area for causing flight turbulence to the insect for repelling said insect from said area.

2. A system according to claim 1 including a plurality of pulse generators adapted to produce a series of pulse signals having said frequencies of multiples of the wing speed of said insect, a plurality of amplifiers connected to said pulse generators and adapted to receive said pulse signals, a plurality of transducers connected to said amplifiers and adapted to receive said pulse signals amplified by said amplifiers for producing said individual ultrasonic turbulence waves for a fraction of a second serially in succession.

3. A system according to claim 2 wherein said insect is a female mosquito having a wing speed of about 600 beats per second, and the frequencies of said individual turbulence waves are 36 KHz, 54 KHz, 72 KHz, and 96 KHz.

4. A system for repelling a flying female mosquito having a predetermined wing speed of about 600 beats per second in flight, comprising:

a plurality of pulse generators operative to generate individual pulse signals for a fraction of a second serially in succession the individual pulse signals having frequencies in multiples of said wing speed of said female mosquito, controlling timer means connected to said pulse generators and adapted to control said pulse generators to generate said pulse signals for a fraction of a second serially in succession over a predetermined time, amplifier means connected to said pulse generators and adapted to receive and to amplify said pulse signals, transducer means connected to said amplifier means and adapted to receive the amplified pulse signals from said amplifiers and to generate serially in succession individual ultrasonic turbulence waves wherein each individual ultrasonic turbulence wave is of a frequency having a multiple of said wing speed of said female mosquito and broadcasting said waves over an area to be protected.

5. A system according to claim 4 wherein said controlling means include an additional pulse generator and two duration timers connected to said plurality of pulse generators and adapted to operate said pulse generators to produce said individual pulse signals serially in succession in a fraction of a second.

6. A system according to claim 5 wherein said individual ultrasonic turbulence waves are of the frequencies of 36 KHz, 54 KHz, 72 KHz, and 96 KHz respectively.

* * * * *